Jan. 5, 1937. F. E. S. SAWYER 2,066,803
WEEDER
Filed Aug. 20, 1936
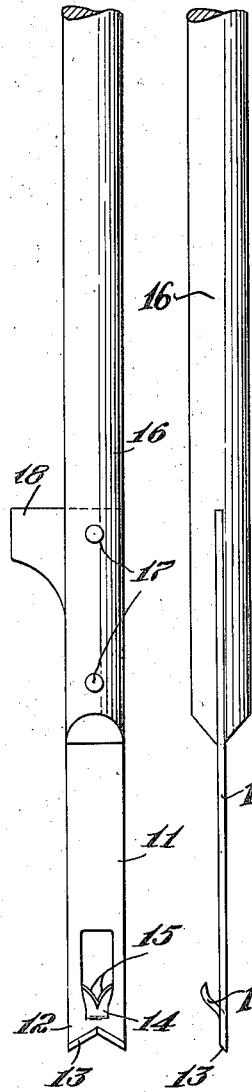
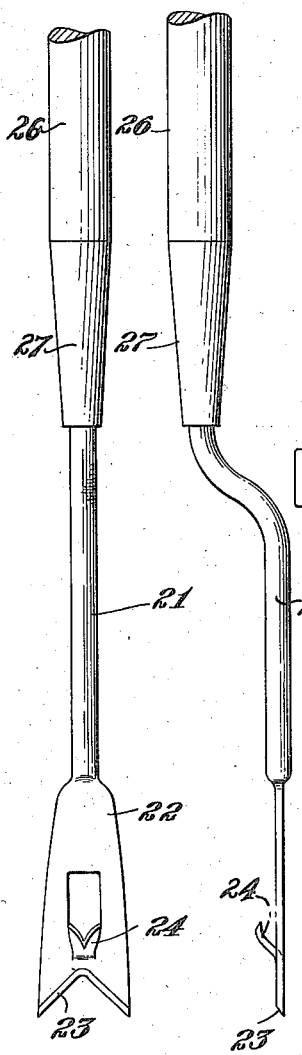
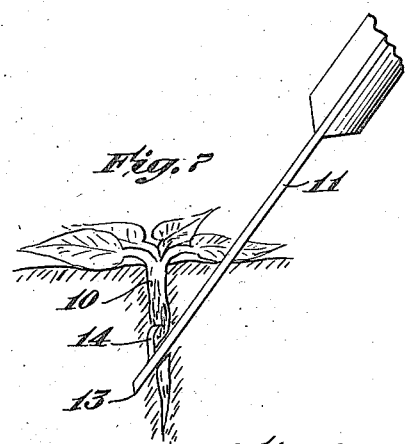
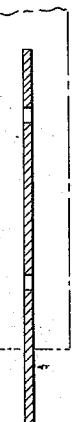
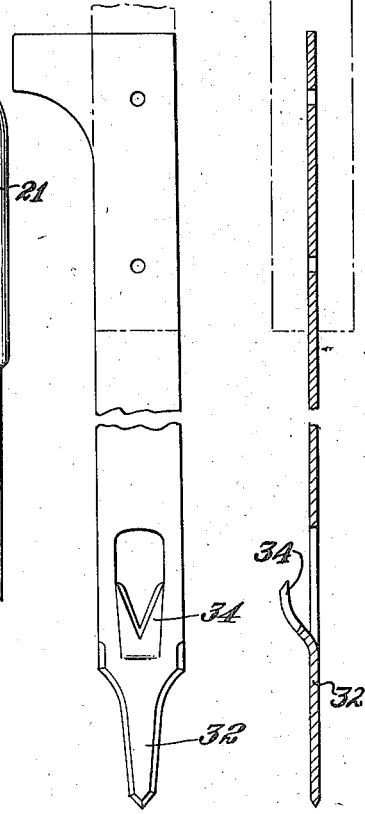
Inventor
Frederick E. S. Sawyer.

Patented Jan. 5, 1937

2,066,803

UNITED STATES PATENT OFFICE 2,066,803

WEEDER

Frederick E. S. Sawyer, Belmont, Mass.

Application August 20, 1936, Serial No. 96,964

2 Claims. (Cl. 55—65)

This invention relates to a garden tool adapted for use in removing weeds or plant roots from the lawn or garden. In this application I shall refer to my improved device as a "weeder", as that is its primary purpose; but it will be understood that the implement may also be used to cut asparagus or to remove other plants or plant roots.

The object of my invention is to provide a handy, easily operated and efficient weeder which will completely remove short-rooted weeds or plants, and will cut the roots of long-rooted weeds and remove the severed tops, without unduly breaking or disrupting the soil or grass around the weed. My weeder is particularly useful in removing dandelions, plantain, crab grass or other weeds from grass lawns, for it will pull or cut-and-pull the weed in one operation and leave it on the surface of the lawn where it may be easily raked up; and it will not seriously displace or damage the lawn.

This object is obtained by providing my improved tool with a weed-pulling fork which projects rearwardly and at a suitable angle or curve from one side of the weeder and near its pointed end. This forked projection is preferably cut from the body of a flat metal part which forms the blade or working end of my weeder, and is bent outwardly and rearwardly, in the manner illustrated in the drawing, so that it will catch the weed root and pull the weed from the ground when the tool is withdrawn.

Several forms of my improved weeder are shown in the annexed drawing, but in each case the forked weed-pulling part is substantially the same; and in each case the device is provided with a long handle so that it may be conveniently operated without stooping or crouching.

Fig. 1 is a front view of a weeder constructed in accordance with this invention; Fig. 2 is a side view of the weeder shown in Fig. 1; Fig. 3 is a front view of a modified form of weeder; Fig. 4 is a side view of the weeder shown in Fig. 3; Fig. 5 is a front view of the blade portion of another modification of the improved weeder; Fig. 6 is a central longitudinal section of the blade shown in Fig. 5; and Fig. 7 is a side view of the weeder shown in Figs. 1 and 2 illustrating the manner of its use in cutting and removing a weed.

In Figs. 1 and 2, showing side and edge views of one form of the device, the weeder blade comprises a flat metal piece 11 having a V-shaped end 12 which is beveled or sharpened to provide a cutting edge 13, and having the forked weed-pulling element 14 struck from the body of the metal and inclined outwardly and rearwardly of the blade. The inner edges 15 of the prongs of the forked projection 14 may also be beveled or sharpened, so that the weed root will be caught when the tool is withdrawn or so that it will be cut and caught on the return stroke of the weeder in case the root has not been severed by the tip 13 on the down stroke. The blade 11 is attached to a long wooden handle 16 by rivets 17 or in any other suitable manner; and preferably has a lateral projection 18 which may be engaged by the foot to force the weeder into hard ground.

In Figs. 3 and 4, showing side and edge views of another form, the blade of the weeder is heavier and has a round shank 21 and flattened end 22 formed with sharpened cutting edges 23 and provided with the forked projection 24 struck from its body as in the first form. This blade part is secured to the handle 26 by a ferrule 27.

In Figs. 5 and 6, the weeder is made like that in Figs. 1 and 2, except that its blade has a single, tapered point 32, instead of a V-shaped or double-pointed cutting edge. The weed-pulling fork 34 is the same as in Figs. 1 to 4.

Fig. 7 illustrates the operation of my weeder in cutting and pulling a long-rooted weed. The pointed end of the blade is inserted into the ground adjacent the weed and at a suitable angle to the ground surface, with the fork 14 uppermost. The blade is then forced toward the weed root 10 by pushing the handle (and stepping on the projection 18, if necessary) until the cutting edge 13 has severed and passed by the root. The weeder is then withdrawn, tilting the handle a little nearer the ground, so that the projecting fork 14 catches the root, as illustrated, and completely removes the weed and the large part of its root. If the root is short, the weed will be removed root and all. Thus, the weed is quickly and effectively displaced to lie on top of the lawn or ground where it may be easily picked up or raked away.

The forked weed-pulling projection not only removes the weed, but also assists materially in reducing disturbances of the ground or damage to the lawn; for it has been found that, owing to its inclination, relative to the blade, it acts as a wedge and causes the blade to take a downward course so that the blade will not break the ground between its point of insertion and the upper end of the weed root.

I claim:

1. A weeder of the class described, comprising a blade having a pointed end, and a weed-pulling element struck from the body of the blade and inclined outwardly and rearwardly relative to the blade, said weed-pulling element having a forked end to catch the weed root.

2. A weeder of the class described, comprising a blade having a V-shaped end with sharp edges, and a forked, weed-pulling member struck from the body of the blade and bent outwardly and rearwardly of the blade, and a handle attached to the blade.

FREDERICK E. S. SAWYER.